US012129149B2

(12) United States Patent
Yoshita

(10) Patent No.: US 12,129,149 B2
(45) Date of Patent: Oct. 29, 2024

(54) MEDIUM CONVEYING APPARATUS

(71) Applicant: PFU Limited, Ishikawa (JP)

(72) Inventor: Shogo Yoshita, Ishikawa (JP)

(73) Assignee: PFU Limited, Ishikawa (JP)

( * ) Notice: Subject to any disclaimer, the term of this patent is extended or adjusted under 35 U.S.C. 154(b) by 348 days.

(21) Appl. No.: 17/476,314

(22) Filed: Sep. 15, 2021

(65) Prior Publication Data

US 2022/0002103 A1 Jan. 6, 2022

Related U.S. Application Data

(63) Continuation of application No. PCT/JP2019/011925, filed on Mar. 20, 2019.

(51) Int. Cl.

| | |
|---|---|
| ***B65H 9/06*** | (2006.01) |
| ***B41J 29/13*** | (2006.01) |
| ***B65H 3/56*** | (2006.01) |
| ***B65H 7/02*** | (2006.01) |

(52) U.S. Cl.

CPC ................ *B65H 9/06* (2013.01); *B41J 29/13* (2013.01); *B65H 7/02* (2013.01)

(58) Field of Classification Search

CPC .......... B65H 2402/441; B65H 2402/60; B65H 9/06; B65H 9/004; B65H 2553/61; B65H 2601/321; B65H 3/56; B65H 3/34

See application file for complete search history.

(56) References Cited

U.S. PATENT DOCUMENTS

| | | | | |
|---|---|---|---|---|
| 8,322,710 B2 * | 12/2012 | Andoh | G03G 15/602 271/145 |
| 2007/0253756 A1 | 11/2007 | Uehara | |
| 2015/0115519 A1 * | 4/2015 | Takezawa | B65H 3/0669 271/124 |
| 2020/0071107 A1 * | 3/2020 | Yoshita | B65H 9/06 |

FOREIGN PATENT DOCUMENTS

| | | |
|---|---|---|
| JP | S56-058744 U | 5/1981 |
| JP | H02-046771 U | 3/1990 |
| JP | H09-86726 A | 3/1997 |
| JP | H10-235909 A | 9/1998 |
| JP | 2005-60058 A | 3/2005 |
| JP | 2007-298740 A | 11/2007 |
| JP | 2010-070367 A | 4/2010 |
| JP | 2014-005100 A | 1/2014 |
| JP | 2014189342 A | * 10/2014 |

OTHER PUBLICATIONS

International Search Report issued in corresponding International Patent Application No. PCT/JP2019/011925, dated Jun. 11, 2019, with English translation.

* cited by examiner

*Primary Examiner* — Luis A Gonzalez
(74) *Attorney, Agent, or Firm* — Rimon P.C.

(57) ABSTRACT

A medium conveying apparatus includes a cover that is supported by a main body so as to be arranged in an opening position or a closing position, an arm that protrudes into a conveying path formed between the cover and the main body and is retracted from the conveying path, a lock mechanism that fixes the cover to the main body with the cover arranged in the closing position, and a mechanism that retracts the arm from the conveying path when the lock mechanism shifts from a first state in which the lock mechanism releases the cover from the main body to a second state in which the lock mechanism fixes the cover to the main body.

6 Claims, 18 Drawing Sheets

MEDIUM CONVEYING APPARATUS

CROSS-REFERENCE TO RELATED APPLICATION

This application is a continuation of International Application No. PCT/JP2019/011925, filed on Mar. 20, 2019, the entire contents of which are incorporated herein by reference.

FIELD

The technology disclosed in the present disclosure relates to a medium conveying apparatus.

BACKGROUND

A medium conveying apparatus with a cover member which can open and close for opening a conveying path on which a medium is conveyed is known (see Japanese Laid-open Patent Publication No. 2014-5100, Japanese Laid-open Patent Publication No. 2010-70367 and Japanese Laid-open Patent Publication No. 10-235909).

However, the medium conveying apparatus may damage a medium at the time of closing the cover member as a result of a protruding object that protrudes into a conveying path sticking into the medium placed on the conveying path.

SUMMARY

According to an aspect of an embodiment, a medium conveying apparatus includes a cover that is supported by a main body so as to be arranged in an opening position or a closing position, an arm that protrudes into a conveying path formed between the cover and the main body and is retracted from the conveying path, a lock mechanism that fixes the cover to the main body with the cover arranged in the closing position, and a mechanism that retracts the arm from the conveying path when the lock mechanism shifts from a first state in which the lock mechanism releases the cover from the main body to a second state in which the lock mechanism fixes the cover to the main body.

The object and advantages of the disclosure will be realized and attained by means of the elements and combinations particularly pointed out in the claims.

It is to be understood that both the foregoing general description and the following detailed description are exemplary and explanatory and are not restrictive of the disclosure.

DESCRIPTION OF EMBODIMENTS

Figure 1:
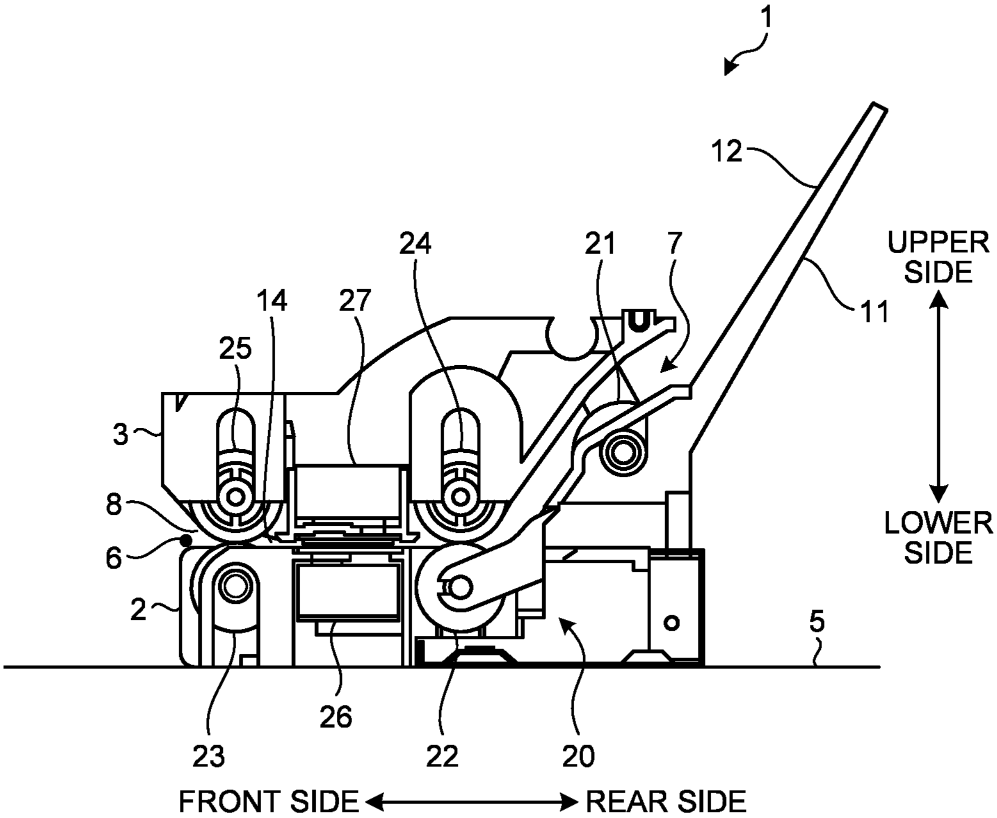
FIG. 1 is a side sectional view illustrating an image reading apparatus that is provided with a medium conveying apparatus according to a the first embodiment.

Preferred embodiments of the disclosure will be explained with reference to accompanying drawings. Preferred embodiments of a medium conveying apparatus disclosed in the present disclosure will be explained below with reference to the accompanying drawings. Furthermore, the technology of the present disclosure is not limited to the embodiments. Furthermore, in the description below, the same reference numerals are assigned to the same components and descriptions of overlapping portions will be omitted.

First Embodiment

A medium conveying apparatus according to a first embodiment is provided in an image reading apparatus 1, as illustrated in FIG. 1. FIG. 1 is a side sectional view illustrating the image reading apparatus 1 that is provided with the medium conveying apparatus according to the first embodiment. The image reading apparatus 1 includes an image reading apparatus main body 2 and a cover 3. The image reading apparatus main body 2 is placed on an installation surface 5 on which the image reading apparatus 1 is installed. The installation surface 5 is formed so as to be along a horizontal plane. The cover 3 is arranged on an upper part of the image reading apparatus main body 2. The cover 3 is supported by the image reading apparatus main body 2 so as to be rotatable about a rotary shaft 6 such that the cover 3 is arranged in a closing position or an opening position. The rotary shaft 6 is parallel to a plane along the installation surface 5.

When the cover 3 is arranged in the closing position, a paper feed port 7 and a discharge port 8 are formed in the image reading apparatus 1. The paper feed port 7 is formed between the image reading apparatus main body 2 and the cover 3 on the rear side of the image reading apparatus 1. The discharge port 8 is formed between the image reading apparatus main body 2 and the cover 3 on the front side of the image reading apparatus 1 that is the opposite side of the rear side where the paper feed port 7 is formed. The discharge port 8 is formed at a position closer to the installation surface 5 than the position in which the paper feed port 7 is formed.

The image reading apparatus 1 further includes a feed tray 11. The feed tray 11 includes a placement surface 12. The feed tray 11 is arranged on the rear side of the image reading apparatus main body 2 such that the placement surface 12 is inclined with respect to the plane along the installation surface 5 and faces obliquely upward. Furthermore, the feed tray 11 is arranged in the vicinity of the paper feed port 7 and fixed to the image reading apparatus main body 2 such that a medium placed on the placement surface 12 moves toward the paper feed port 7 due to gravity.

When the cover 3 is arranged in the closing position, a conveying path 14 is formed between the image reading apparatus main body 2 and the cover 3 of the image reading apparatus 1. One end of the conveying path 14 is connected to the paper feed port 7 and the other end of the conveying path 14 is connected to the discharge port 8.

The image reading apparatus 1 further includes a conveying portion 20. The conveying portion 20 includes a separating portion 21, a first feed roller 22, a second feed roller 23, a first pressure roller 24, and a second pressure roller 25. The separating portion 21 is formed in the vicinity of the paper feed port 7 of the conveying path 14. The separating portion 21 separates a single medium that is in contact with the placement surface 12 of the feed tray 11 from a plurality of media that are inserted into the paper feed port 7. The separating portion 21 conveys the single separated medium along the conveying path 14 toward the discharge port 8.

The first feed roller 22 is formed in a cylindrical shape. The first feed roller 22 is arranged between the separating portion 21 and the discharge port 8 on the lower side of the conveying path 14. The first feed roller 22 is rotatably supported by the image reading apparatus main body 2. The first pressure roller 24 is formed in a cylindrical shape. The first pressure roller 24 is arranged on the upper side of the conveying path 14 and above the first feed roller 22. The first pressure roller 24 is rotatably supported by the cover 3 so as to be capable of translating in a vertical direction perpendicular to the plane along the installation surface 5. The first pressure roller 24 presses a medium placed on the conveying path 14 against the first feed roller 22. The first feed roller 22 rotates counterclockwise in FIG. 1, so that the first feed roller 22 conveys the medium, which is pressed against the first feed roller 22 by the first pressure roller 24, toward the discharge port 8 along the conveying path 14.

The second feed roller 23 is formed in a cylindrical shape. The second feed roller 23 is arranged between the first feed roller 22 and the discharge port 8 on the lower side of the conveying path 14 and is rotatably supported by the image reading apparatus main body 2. The second pressure roller 25 is formed in a cylindrical shape. The second pressure roller 25 is arranged on the upper side of the conveying path 14 and above the second feed roller 23. The second pressure roller 25 is rotatably supported by the cover 3 so as to be capable of translating in a vertical direction perpendicular to the plane along the installation surface 5. The second pressure roller 25 presses the medium placed on the conveying path 14 against the second feed roller 23. The second feed roller 23 rotates counterclockwise in FIG. 1, so that the second feed roller 23 conveys the medium, which is pressed against the second feed roller 23 by the second pressure roller 25, toward the discharge port 8 along the conveying path 14.

The image reading apparatus further includes a lower-side reading portion 26 and an upper-side reading portion 27. The lower-side reading portion 26 is formed of a contact image sensor (CIS) type image sensor. The lower-side reading portion 26 is arranged between the first feed roller 22 and the second feed roller 23 on the lower side of the conveying path 14. The lower-side reading portion 26 reads an image on the surface on the lower side of the medium that is conveyed on the conveying path 14. The upper-side reading portion 27 is formed of the CIS-type image sensor. The upper-side reading portion 27 is arranged between the first pressure roller 24 and the second pressure roller 25 on the upper side of the conveying path 14 and above the lower-side reading portion 26. The upper-side reading portion 27 reads an image on the surface of the upper side of the medium that is conveyed on the conveying path 14.

Figure 2:
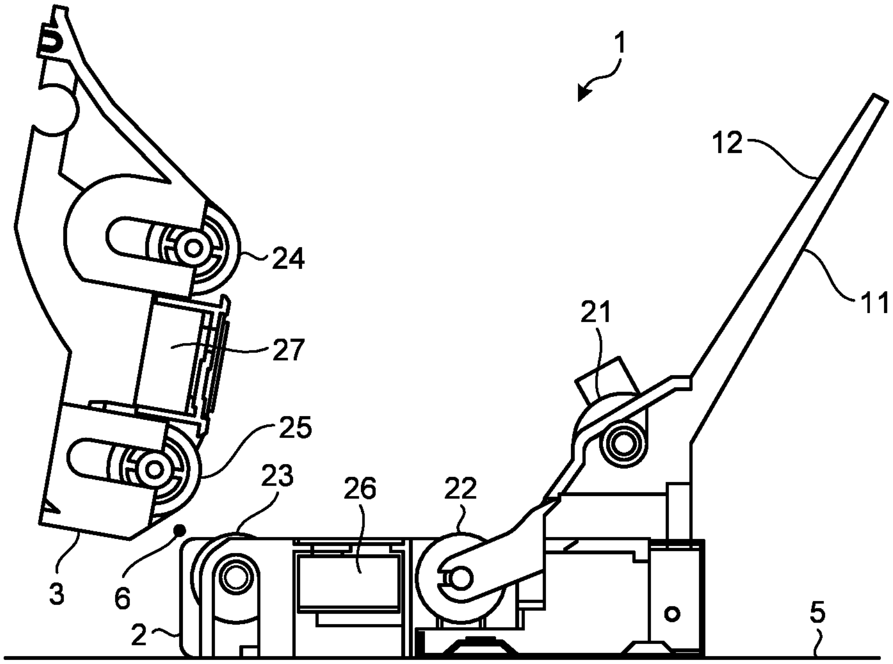
FIG. 2 is a side sectional view illustrating the image reading apparatus when a cover member is arranged in an opening position.

FIG. 2 is a side sectional view illustrating the image reading apparatus 1 when the cover 3 is arranged in the opening position. When the cover 3 is arranged in the opening position, the first pressure roller 24 is away from the first feed roller 22. When the cover 3 is arranged in the opening position, the second pressure roller 25 is away from the second feed roller 23. When the cover 3 is arranged in the opening position, the medium conveyed along the conveying path 14 separates from both of the first pressure roller 24 and the second pressure roller 25, therefore, it is possible to easily take out the medium from the image reading apparatus 1.

Figure 3:
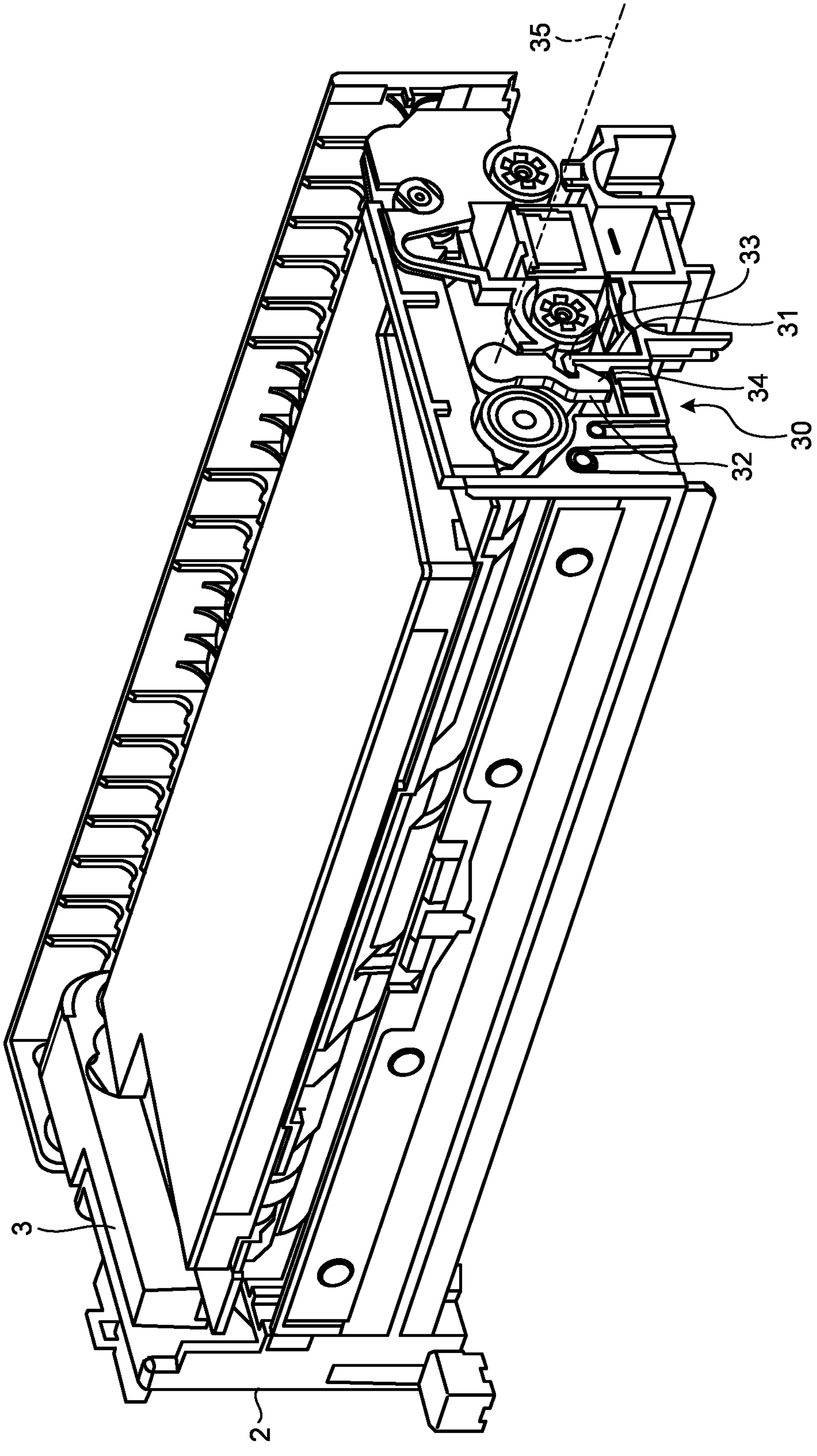
FIG. 3 is a perspective view illustrating a lock mechanism.

The image reading apparatus 1 includes a lock mechanism 30 as illustrated in FIG. 3. FIG. 3 is a perspective view illustrating the lock mechanism 30. The lock mechanism 30 includes a body-side lock member 31 and a cover-side lock member 32. The body-side lock member 31 includes a body-side claw 33 and is fixed to the image reading apparatus main body 2. The cover-side lock member 32 includes a cover-side claw 34 and is fixed to the cover 3 so as to be rotatable about a rotary shaft 35 to be arranged in a first position or a second position. The rotary shaft 35 is parallel to the rotary shaft 6. When the cover 3 is arranged in the closing position and the cover-side lock member 32 is arranged in the first position, the cover-side claw 34 hooks to the body-side claw 33. the body-side claw 33, the cover 3 is fixed to the image reading apparatus main body 2 so as not to move from the closing position toward the opening position.

Figure 4:
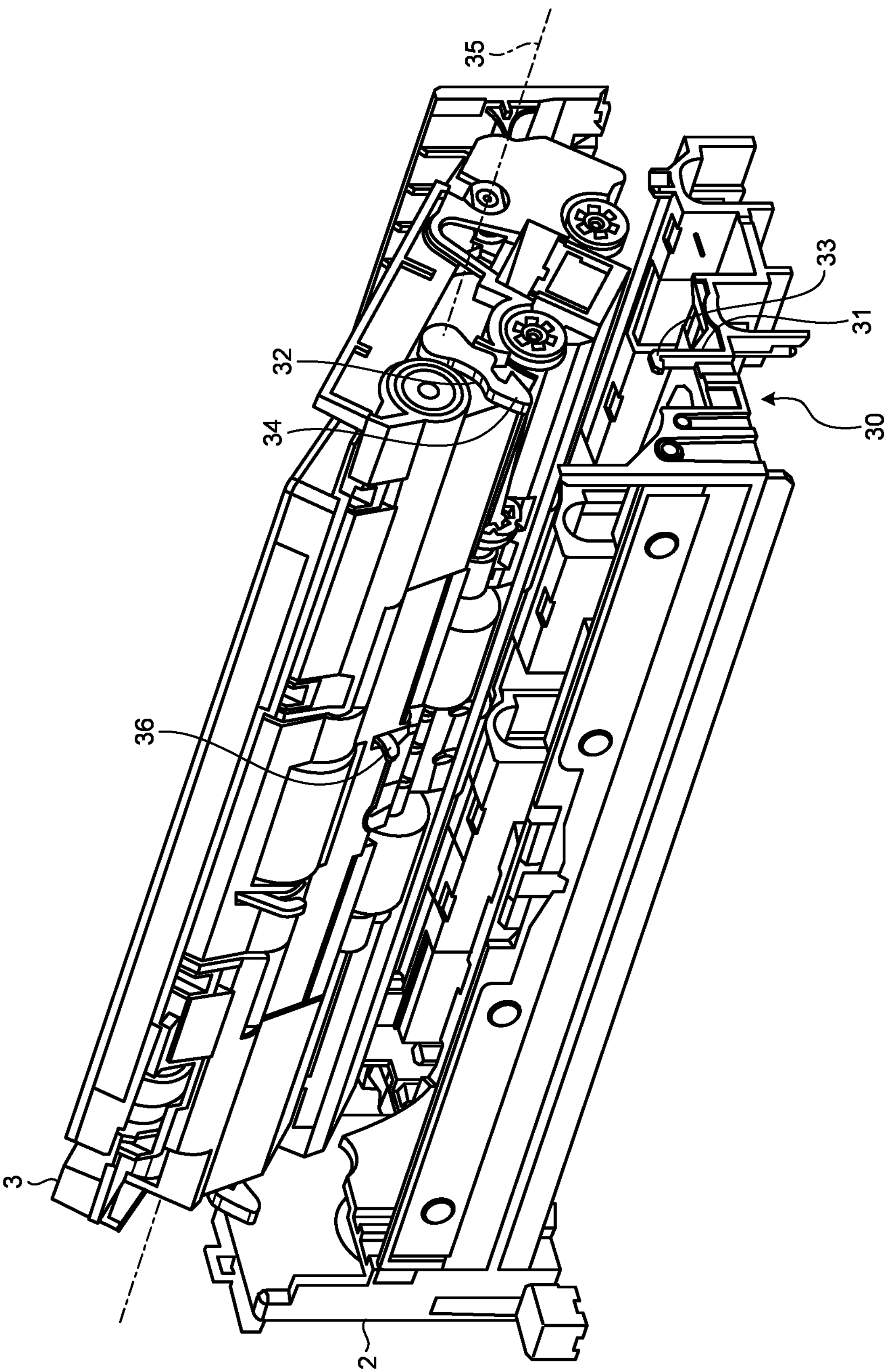
FIG. 4 is a perspective view illustrating a body-side lock member and a cover-side lock member when the cover member is arranged in the opening position.

When the cover-side lock member 32 is arranged in the second position, the cover-side claw 34 unhooks from the body-side claw 33. Because cover-side claw 34 unhooks from the body-side claw 33, the cover 3 is released from the image reading apparatus main body 2 so as to be movable with respect to the image reading apparatus main body 2. FIG. 4 is a perspective view illustrating the body-side lock member 31 and the cover-side lock member 32 when the cover 3 is arranged in the opening position. When the cover 3 is arranged in the opening position, the cover-side claw 34 of the cover-side lock member 32 is not hooked to the body-side claw 33 of the body-side lock member 31 and away from the body-side lock member 31. The image reading apparatus 1 further includes an arm 36.

Figure 5:
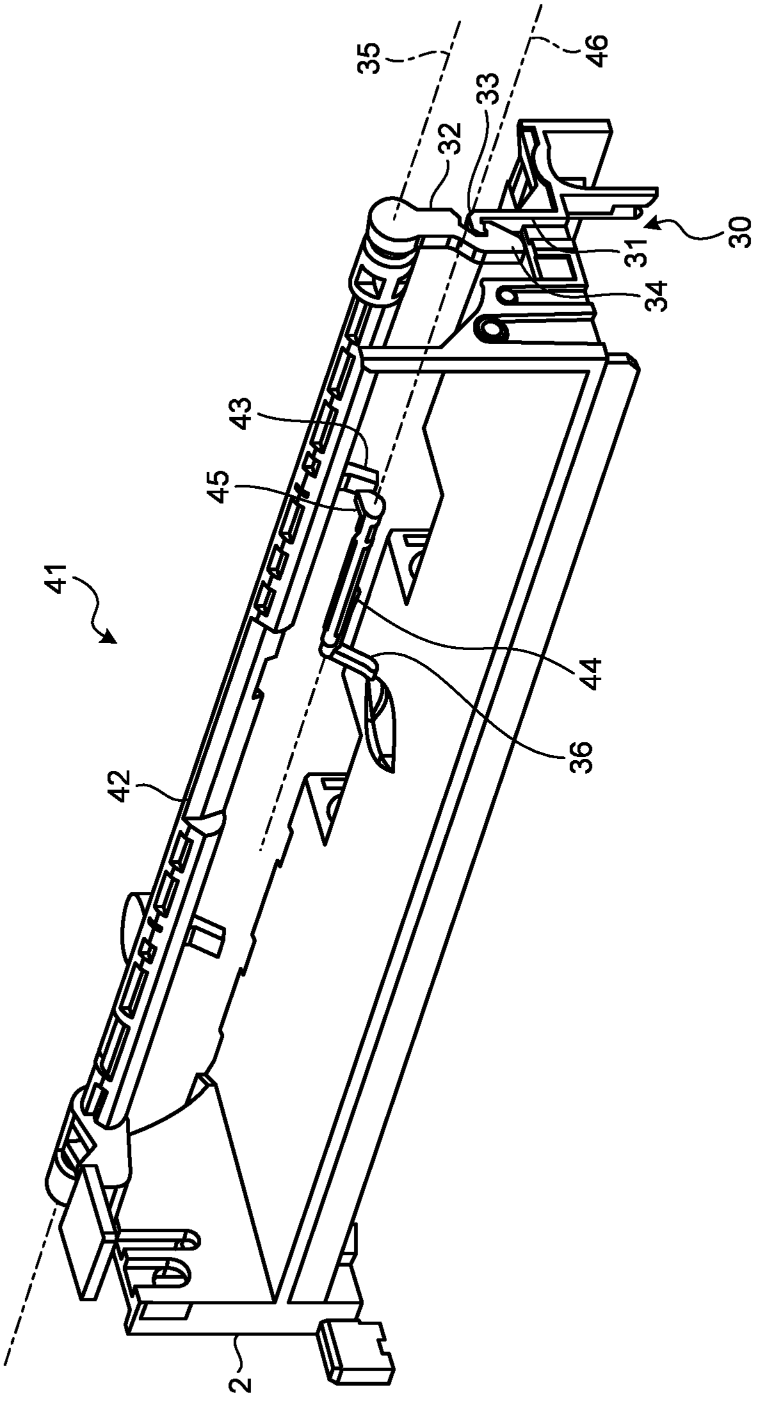
FIG. 5 is a perspective view illustrating an arm retracting mechanism.

As illustrated in FIG. 5, the image reading apparatus 1 includes an arm retracting mechanism 41. FIG. 5 is a perspective view illustrating the arm retracting mechanism 41. The arm retracting mechanism 41 includes a lock shaft 42, a lock-side contact member 43, an arm shaft 44, and an arm-side contact member 45. The lock shaft 42 is formed in a rod shape and arranged to be along the rotary shaft 35. The lock shaft 42 is fixed to the cover-side lock member 32 and supported by the image reading apparatus main body 2 so as to be rotatable about the rotary shaft 35. The lock-side contact member 43 is formed in a plate shape, fixed to the lock shaft 42, and fixed to the cover-side lock member 32 via the lock shaft 42.

The arm shaft 44 is formed in a rod shape and arranged to be along a rotary shaft 46. The rotary shaft 46 is parallel to the rotary shaft 35. The arm shaft 44 is supported by the cover 3 so as to be rotatable about the rotary shaft 46. The arm-side contact member 45 is arranged in the vicinity of the lock-side contact member 43 and fixed to the arm shaft 44. The arm 36 is fixed to the arm shaft 44. Because the arm 36 is fixed to the arm shaft 44, the arm 36 is supported by the cover 3 so as to be rotatable about the rotary shaft 46 to be arranged in the blocking position or the retracting position.

Figure 6:
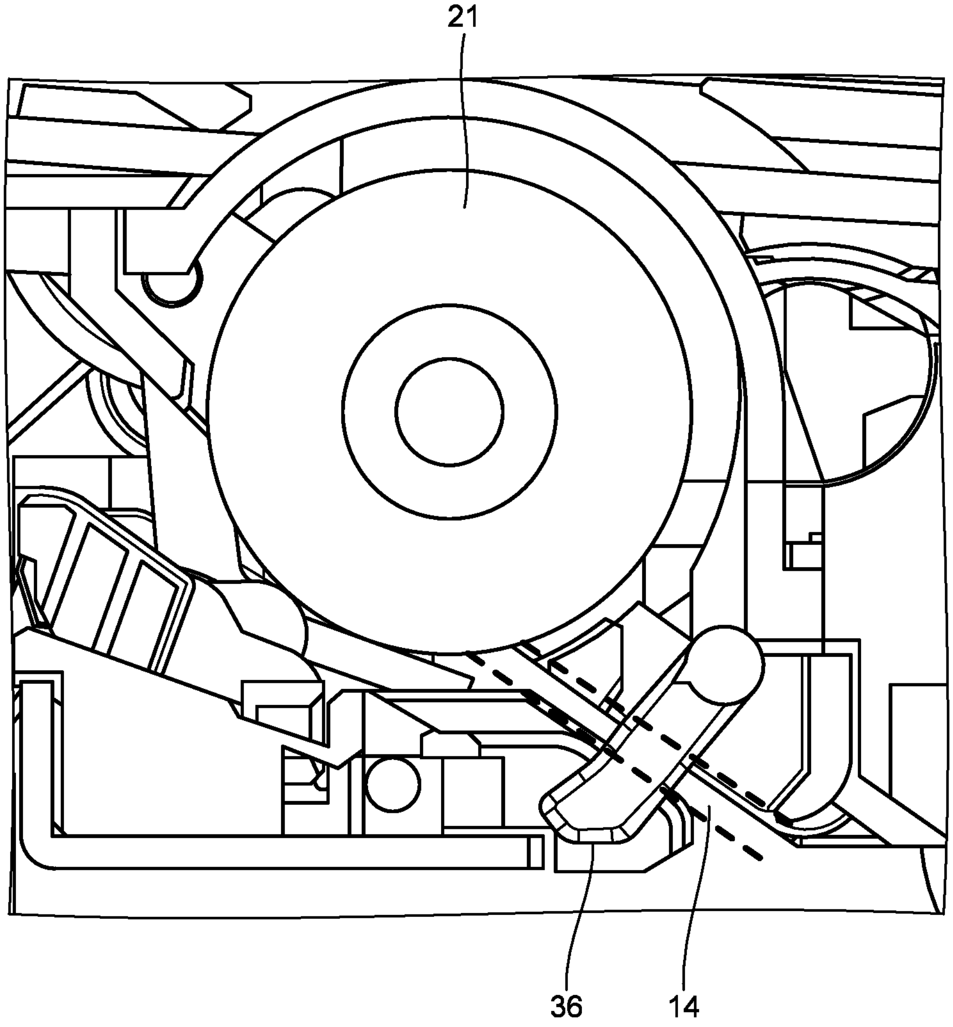
FIG. 6 is a side sectional view illustrating a conveying path 14 when the cover member is arranged in a closing position and an arm is arranged in a blocking position.

When the cover 3 is arranged in the closing position, the arm 36 is sometimes arranged in the blocking position. FIG. 6 is a side sectional view illustrating the conveying path 14 when the cover 3 is arranged in the closing position and the arm 36 is arranged in the blocking position. When the arm 36 is arranged in the blocking position with the cover 3 arranged in the closing position, the arm 36 protrudes into the conveying path 14 and blocks between the separating portion 21 and the first feed roller 22 of the conveying path 14.

Figure 7:
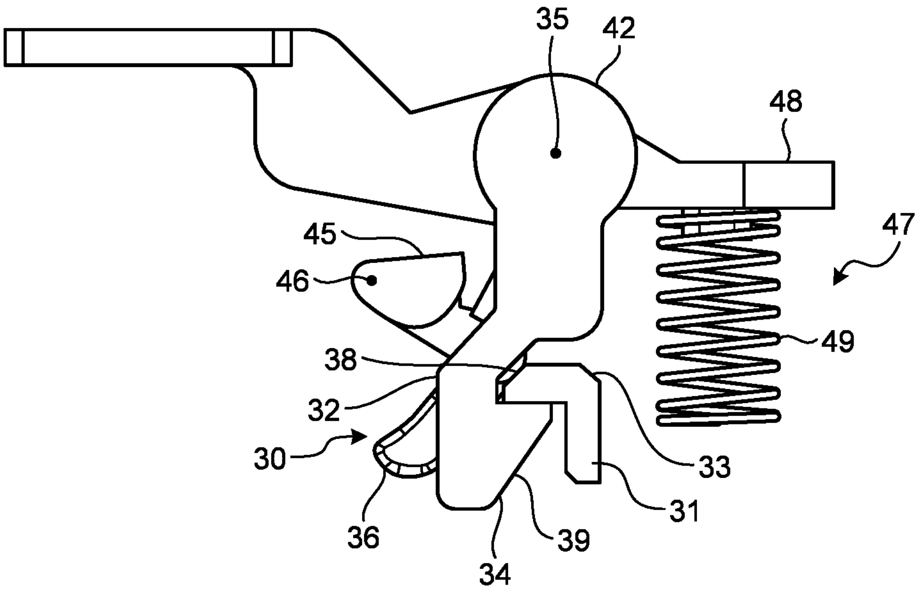
FIG. 7 is a side view illustrating the lock mechanism.

FIG. 7 is a side view illustrating the lock mechanism 30. The body-side lock member 31 includes a body-side sliding surface 38. The body-side sliding surface 38 is formed at a position opposite to the cover-side lock member 32 of the body-side lock member 31. The cover-side lock member 32 includes a cover-side sliding surface 39. The cover-side sliding surface 39 is formed at a position opposite to the body-side lock member 31 of the cover-side lock member 32.

The lock mechanism 30 further includes a pressing portion 47. The pressing portion 47 includes a contact member 48 and a spring 49. The contact member 48 is fixed to the lock shaft 42 and fixed to the cover-side lock member 32 via the lock shaft 42. The spring 49 is formed by a compression coil spring. One end of the spring 49 is fixed to the contact member 48 and the other end of the spring 49 is fixed to the cover 3. The spring 49 applies an elastic force to the contact member 48 such that the cover-side lock member 32 rotates about rotary shaft 35 in a counterclockwise direction illustrated in FIG. 7 toward the first position. Because the elastic force is applied to the cover-side lock member 32 by the spring 49, the cover-side claw 34 hooked to the body-side claw 33 is prevented from unhooking from the body-side claw 33, whereby the lock mechanism 30 is able to appropriately fix the cover 3 to the image reading apparatus main body 2.

Figure 8:
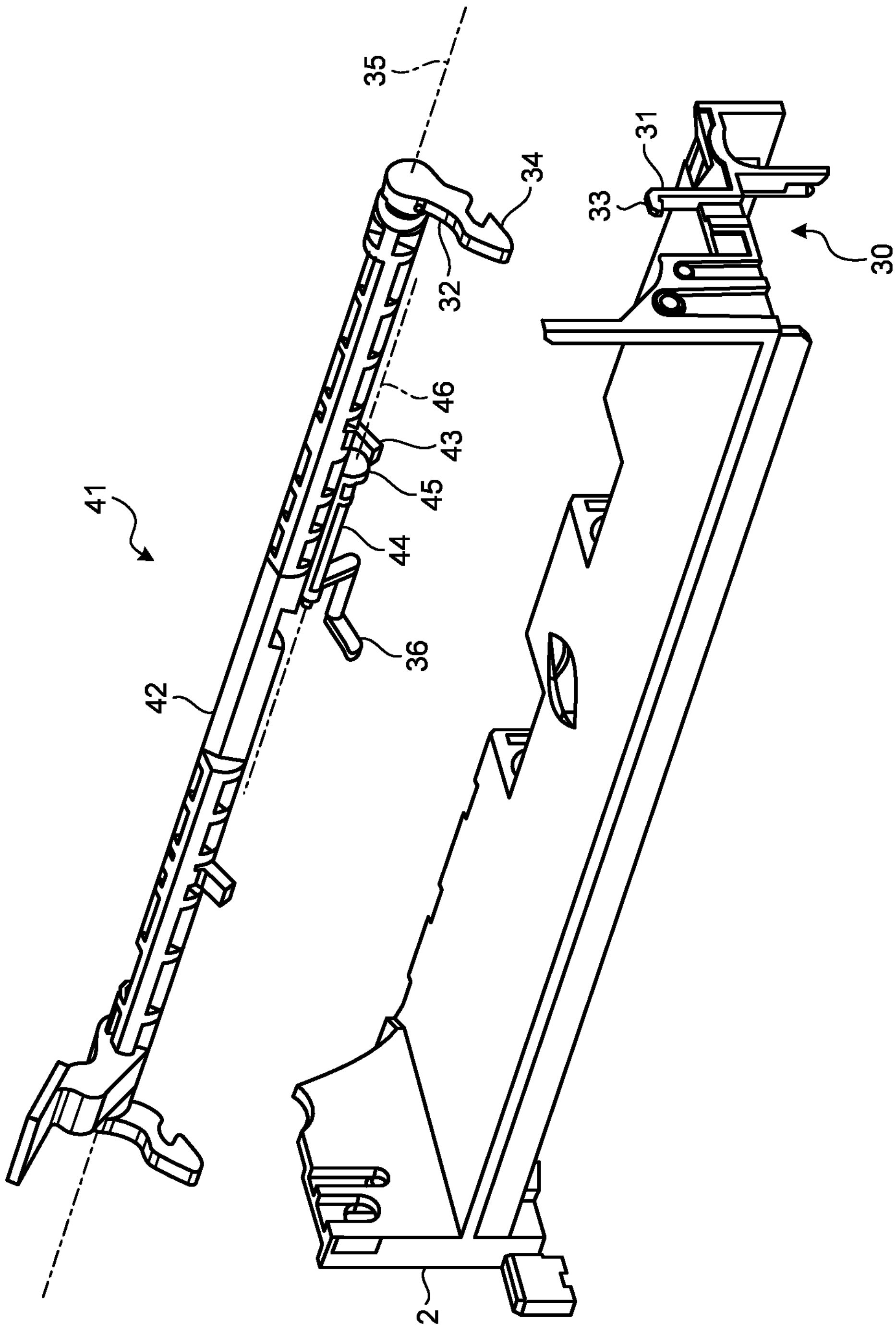
FIG. 8 is a perspective view illustrating an arm retracting mechanism when the cover member is arranged in the opening position.

FIG. 8 is a perspective view illustrating the arm retracting mechanism 41 when the cover 3 is arranged in the opening position. When the cover 3 is arranged in the opening position, the cover-side lock member 32 is away from the body-side lock member 31. Because the elastic force is applied from the pressing portion 47 even when the cover 3 is arranged in the opening position, the cover-side lock member 32 moves toward the first position and is arranged in the first position.

Figure 9:
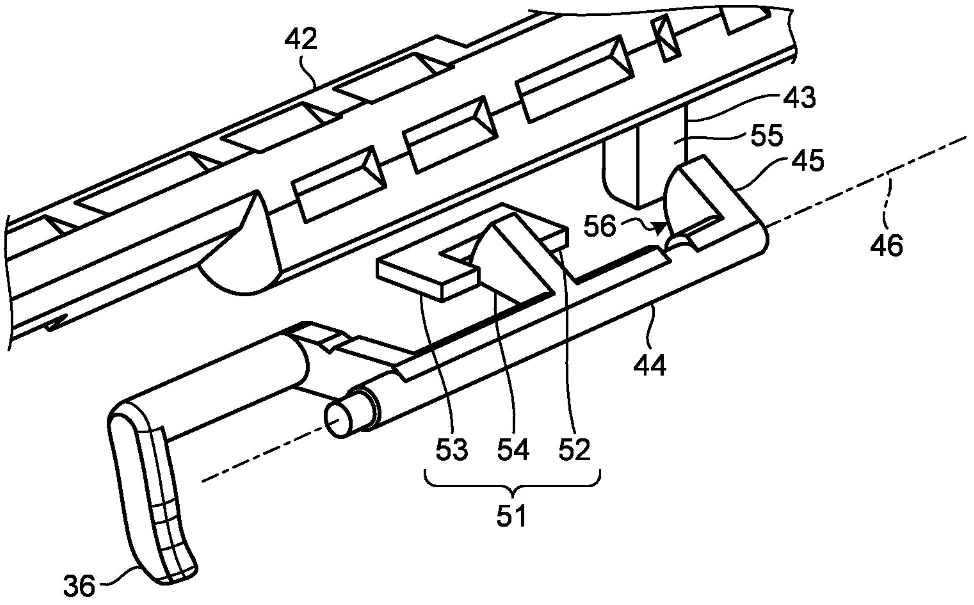
FIG. 9 is another perspective view illustrating the arm retracting mechanism.

FIG. 9 is another perspective view illustrating the arm retracting mechanism 41. The lock-side contact member 43 includes a lock-side sliding surface 55. The lock-side sliding surface 55 is formed at a position opposite to the arm-side contact member 45 of the lock-side contact member 43. The arm-side contact member 45 includes an arm-side sliding surface 56. The arm-side sliding surface 56 is formed at a position opposite to the lock-side contact member 43 of the arm-side contact member 45. The arm-side sliding surface 56 is not in contact with the lock-side sliding surface 55 when the cover-side lock member 32 is arranged in the first position. Accordingly, when the cover-side lock member 32 is arranged in the first position, the arm 36 is released so as to be movable with respect to the cover 3 to be arranged in the blocking position or the retracting position.

As illustrated in FIG. 9, the image reading apparatus 1 further includes a leading end position detection sensor 51. The leading end position detection sensor 51 includes a light-emitting portion 52, a light-receiving portion 53, and a shielding member 54. The light-emitting portion 52 is arranged in the vicinity of the arm shaft 44 and fixed to the cover 3. The light-emitting portion 52 emits light. The light-receiving portion 53 is arranged in the vicinity of the arm shaft 44 so as to receive the light emitted from the light-emitting portion 52 and fixed to the cover 3. The shielding member 54 is fixed to the arm shaft 44 and fixed to the arm 36 via the arm shaft 44. The shielding member 54 is arranged between the light-emitting portion 52 and the light-receiving portion 53 when the arm 36 is arranged in the blocking position and blocks the light travelling from the light-emitting portion 52 to the light-receiving portion 53.

Figure 10:
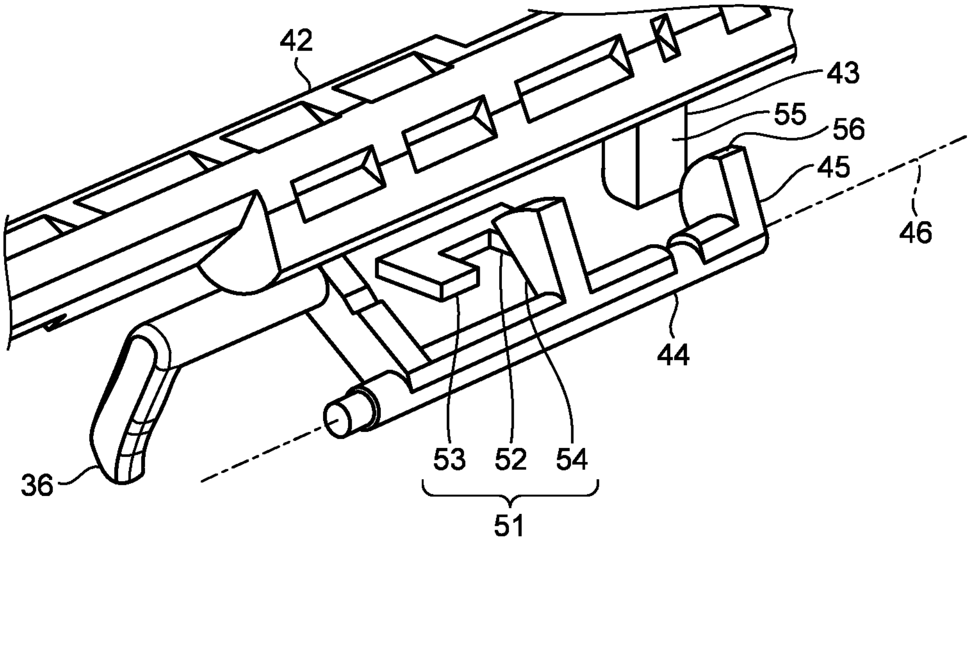
FIG. 10 is a perspective view illustrating a leading end position detection sensor when the arm is arranged in a retracting position.

FIG. 10 is a perspective view illustrating the leading end position detection sensor 51 when the arm 36 is arranged in the retracting position. The shielding member 54 is away from a position between the light-emitting portion 52 and the light-receiving portion 53 when the arm 36 is arranged in the retracting position and does not block the light travelling from the light-emitting portion 52 to the light-receiving portion 53. Thus, the light-receiving portion 53 does not receive the light emitted from the light-emitting portion 52 when the arm 36 is arranged in the blocking position and receives the light emitted from the light-emitting portion 52 when the arm 36 is arranged in the retracting position. When the light emitted from the light-emitting portion 52 is received by the light-receiving portion 53, the leading end position detection sensor 51 judges that the arm 36 is arranged in the retracting position and judges that a medium is in a region of the conveying path 14 in which the arm 36 arranged in the blocking position is arranged. When the light emitted from the light-emitting portion 52 is not received by the light-receiving portion 53, the leading end position detection sensor 51 judges that medium is not in the region of the conveying path 14 in which the arm 36 arranged in the blocking position is arranged.

Operation of the Image Reading Apparatus 1

When a user desires to read images on the media by using the image reading apparatus 1, the user places a plurality of media on the feed tray 11. When the media are placed on the feed tray 11, the media are inserted into the paper feed port 7 due to gravity and contact with the separating portion 21. The separating portion 21 separates the media that are placed on the feed tray 11 from a single medium and conveys the separated medium toward the first feed roller 22 along the conveying path 14.

After the arm 36 is arranged in the retracting position, the medium conveyed toward the first feed roller 22 is sandwiched between the first feed roller 22 and the first pressure roller 24. The medium sandwiched between the first feed roller 22 and the first pressure roller 24 is conveyed toward the discharge port 8 along the conveying path 14 due to rotation of the first feed roller 22.

The medium conveyed along the conveying path 14 by the first feed roller 22 and the first pressure roller 24 is conveyed between the lower-side reading portion 26 and the upper-side reading portion 27 of the conveying path 14. The lower-side reading portion 26 captures an image of the lower side of the medium conveyed along the conveying path 14. The upper-side reading portion 27 captures an image of the upper side of the medium conveyed along the conveying path 14.

The medium on which the image has been captured is then sandwiched between the second feed roller 23 and the second pressure roller 25. The medium sandwiched between the second feed roller 23 and the second pressure roller 25 is conveyed toward the discharge port 8 along the conveying path 14 due to rotation of the second feed roller 23 and discharged from the discharge port 8.

The leading end position detection sensor 51 judges whether the arm 36 is arranged in the blocking position or the retracting position, thereby judging whether the medium is in a predetermined region of the conveying path 14 in which the arm 36 arranged in the blocking position is arranged. After a predetermined time has elapsed since it is judged that the medium is not in the predetermined region of the conveying path 14 by the leading end position detection sensor 51, the first feed roller 22 and the second feed roller 23 are stopped to rotate.

The user arranges the cover 3 in the opening position when maintenance is performed on the conveying path 14 or the conveying portion 20. By arranging the cover 3 in the opening position, the user easily views the conveying path 14 and the conveying portion 20, which makes it possible to easily perform maintenance on the conveying path 14 and the conveying portion 20.

Figure 11:
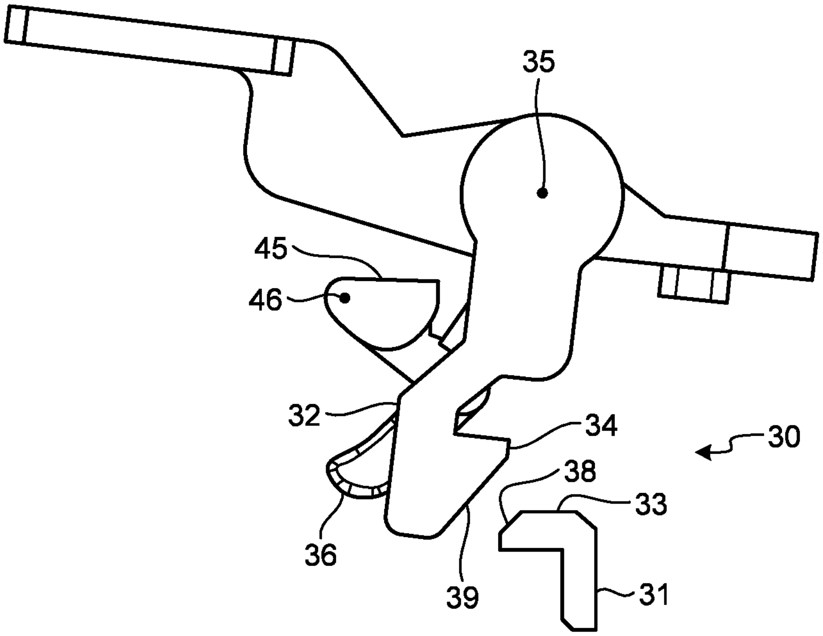
FIG. 11 is a side view illustrating a lock mechanism when the cover member is arranged in the opening position.

After the user performs maintenance on the conveying path 14 and the conveying portion 20, the user moves the cover 3 from the opening position to the closing position. FIG. 11 is a side view illustrating the lock mechanism 30 when the cover 3 is arranged in the opening position. When the cover 3 is arranged in the opening position, the cover-side lock member 32 is away from the body-side lock member 31 and released so as to be movable with respect to the cover 3. At this time, because an elastic force is applied from the pressing portion 47, the cover-side lock member 32 moves toward the first position and is arranged in the first position.

Figure 12:
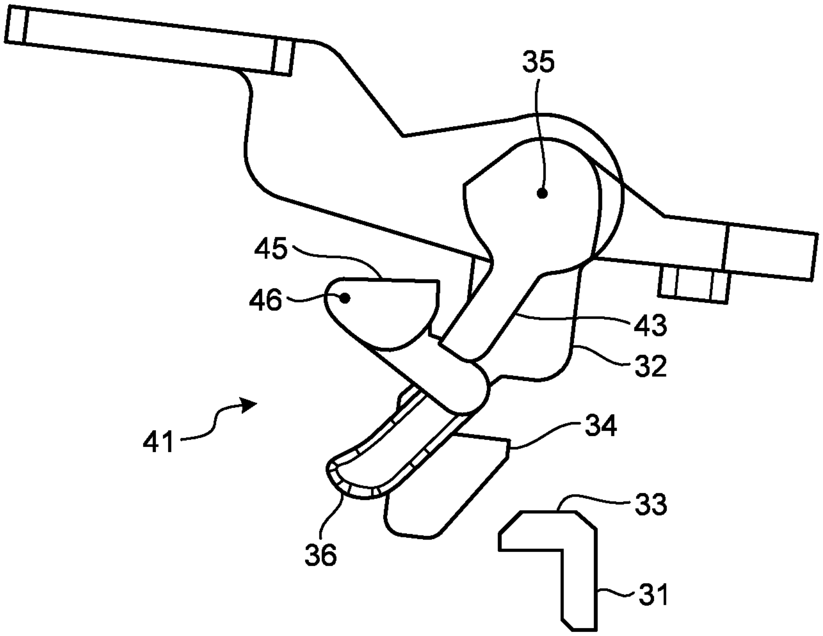
FIG. 12 is a side view illustrating the arm retracting mechanism when the cover member is arranged in the opening position.

FIG. 12 is a side view illustrating the arm retracting mechanism 41 when the cover 3 is arranged in the opening position. When the cover-side lock member 32 is arranged in the first position, the arm-side contact member 45 is away from the lock-side contact member 43. Because the arm-side contact member 45 is away from the lock-side contact member 43, the arm 36 is released so as to be movable with respect to the cover 3 to be arranged in the blocking position or the retracting position.

Figure 13:
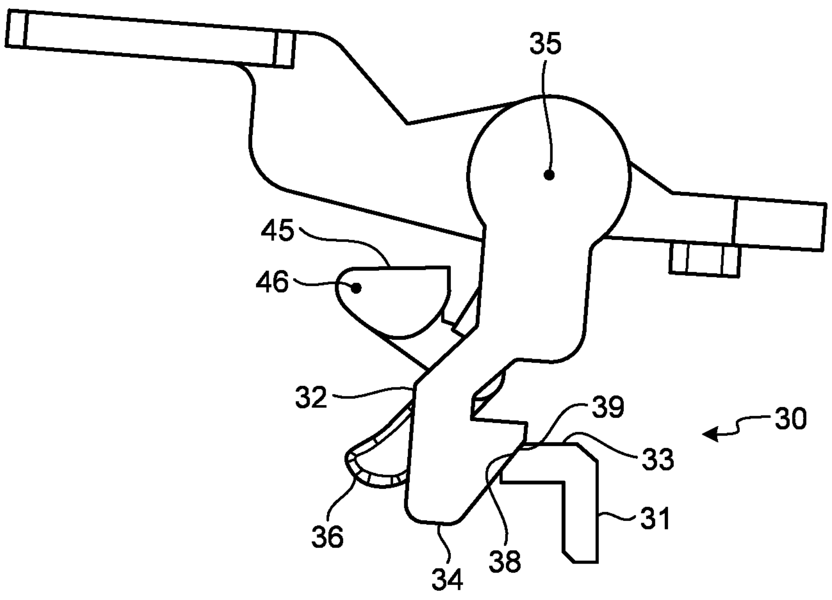
FIG. 13 is a side view illustrating the lock mechanism when the cover member approached the closing position.

FIG. 13 is a side view illustrating the lock mechanism 30 when the cover 3 approached the closing position. The cover 3 approaches the closing position with the cover-side lock member 32 arranged in the first position, so that the cover-side sliding surface 39 of the cover-side lock member 32 comes into contact with the body-side sliding surface 38 of the body-side lock member 31.

Figure 14:
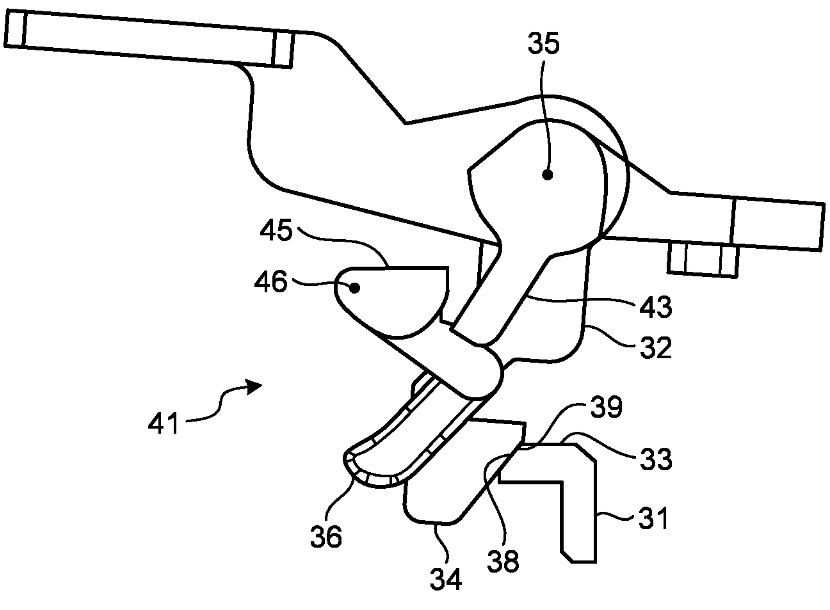
FIG. 14 is a side view illustrating the arm retracting mechanism when a cover-side sliding surface of the cover-side lock member contacted with a body-side sliding surface of the body-side lock member.

FIG. 14 is a side view illustrating the arm retracting mechanism 41 when the cover-side sliding surface 39 contacted with the body-side sliding surface 38. Even when the cover-side sliding surface 39 contacted with the body-side sliding surface 38, the arm-side contact member 45 is away from the lock-side contact member 43 while the cover-side lock member 32 is arranged in the first position. Accordingly, at this time too, because the arm-side contact member 45 is away from the lock-side contact member 43, the arm 36 is released so as to be movable with respect to the cover 3.

Figure 15:
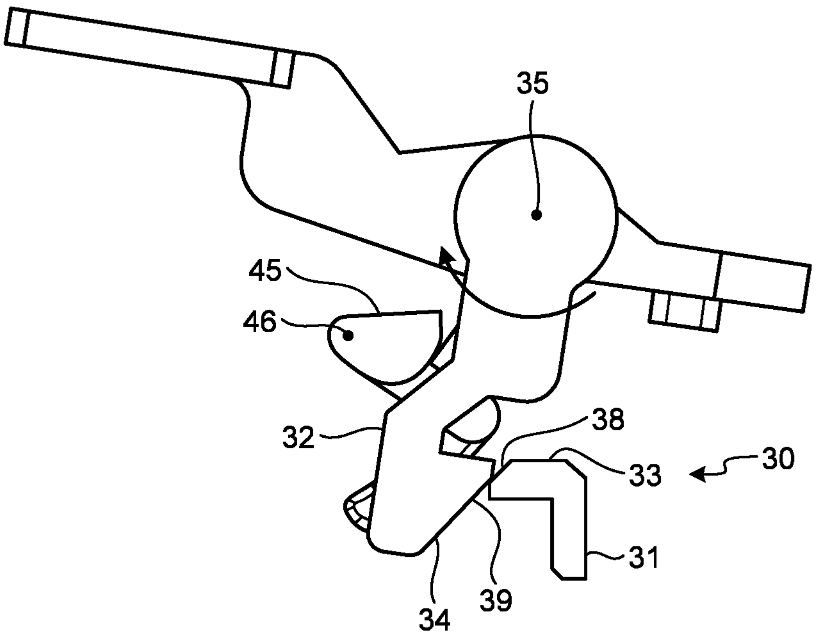
FIG. 15 is a side view illustrating the lock mechanism when the cover member further approached the closing position after the cover-side sliding surface of the cover-side lock member contacted with the body-side sliding surface of the body-side lock member.

FIG. 15 is a side view illustrating the lock mechanism 30 when the cover 3 further approached the closing position after the cover-side sliding surface 39 contacted with the body-side sliding surface 38. After the cover-side sliding surface 39 contacted with the body-side sliding surface 38, the cover-side sliding surface 39 slides along the body-side sliding surface 38 with the cover 3 approaching the closing position. The cover-side sliding surface 39 slides along the body-side sliding surface 38, so that the cover-side lock member 32 rotate clockwise, in FIG. 15, about the rotary shaft 35 toward the second position.

Figure 16:
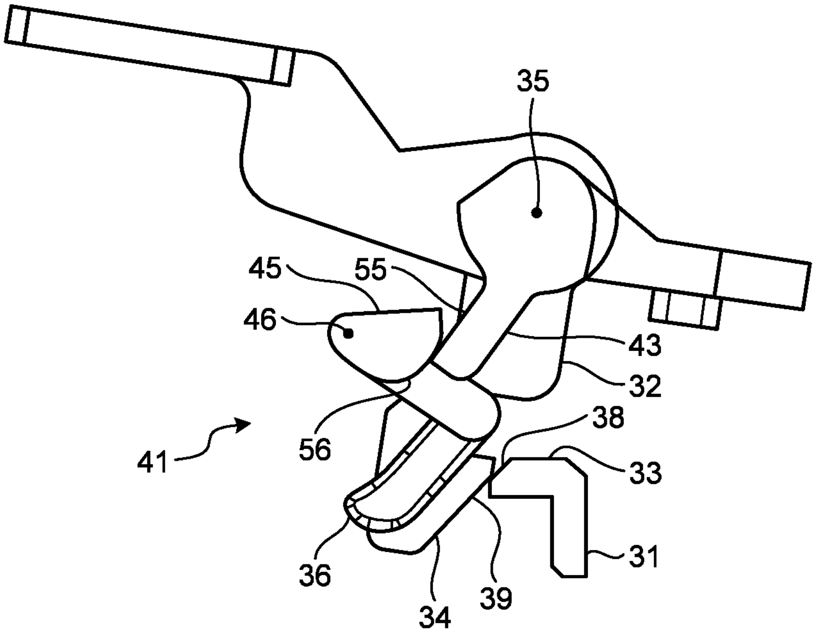
FIG. 16 is a side view illustrating the arm retracting mechanism when the cover-side lock member rotated toward a second position.

FIG. 16 is a side view illustrating the arm retracting mechanism 41 when the cover-side lock member 32 rotated toward the second position. When the arm 36 is arranged in the blocking position, the cover-side lock member 32 moves toward the second position, so that the lock-side sliding surface 55 of the lock-side contact member 43 comes into contact with the arm-side sliding surface 56 of the arm-side contact member 45. After the lock-side sliding surface 55 contacted with the arm-side sliding surface 56, the lock-side sliding surface 55 slides along the arm-side sliding surface

56 with the cover-side lock member 32 further rotating toward the second position. The lock-side sliding surface 55 slides along the arm-side sliding surface 56, so that the lock-side contact member 43 presses the arm-side contact member 45. The arm-side contact member 45 is pressed by the lock-side contact member 43, so that the arm-side contact member 45 rotates counterclockwise about the rotary shaft 46 in FIG. 16. The arm-side contact member 45 rotates counterclockwise, so that the arm 36 moves toward the retracting position.

Figure 17:
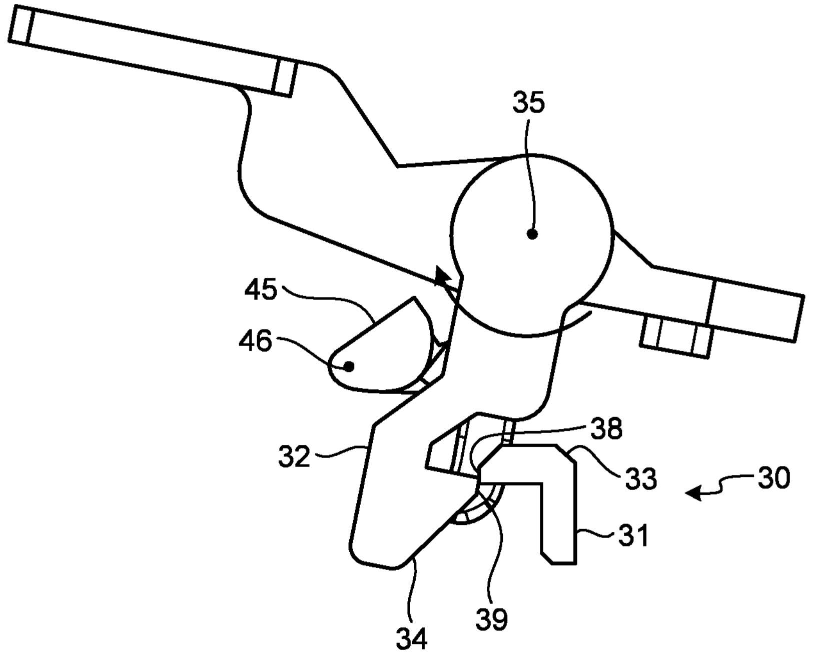
FIG. 17 is a side view illustrating the lock mechanism when the cover member further approached the closing position after the lock-side sliding surface contacted with an arm-side sliding surface.

FIG. 17 is a side view illustrating the lock mechanism 30 when the lock-side sliding surface 55 contacted with the arm-side sliding surface 56 and then the cover 3 further approached the closing position. After the lock-side sliding surface 55 contacted with the arm-side sliding surface 56, the cover-side sliding surface 39 further slides along the body-side sliding surface 38 with the cover 3 further approaching the closing position. The cover-side sliding surface 39 further slides along the body-side sliding surface 38, so that the cover-side lock member 32 rotates about the rotary shaft 35 and is arranged in the second position.

Figure 18:
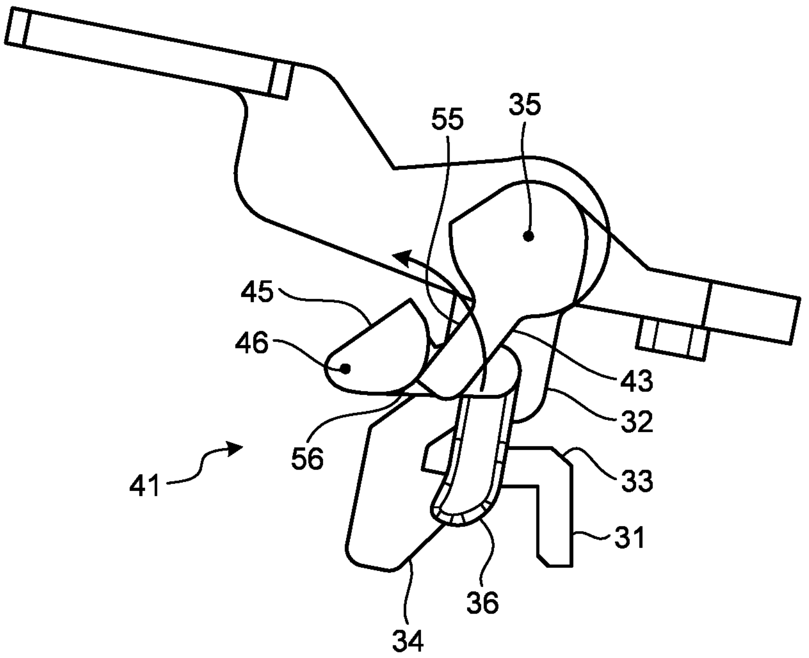
FIG. 18 is a side view illustrating the arm retracting mechanism when the cover-side lock member is arranged in the second position.

FIG. 18 is a side view illustrating the arm retracting mechanism 41 when the cover-side lock member 32 is arranged in the second position. The cover-side lock member 32 is arranged in the second position, so that the arm 36 is arranged in the retracting position and is retracted from the conveying path 14.

Figure 19:
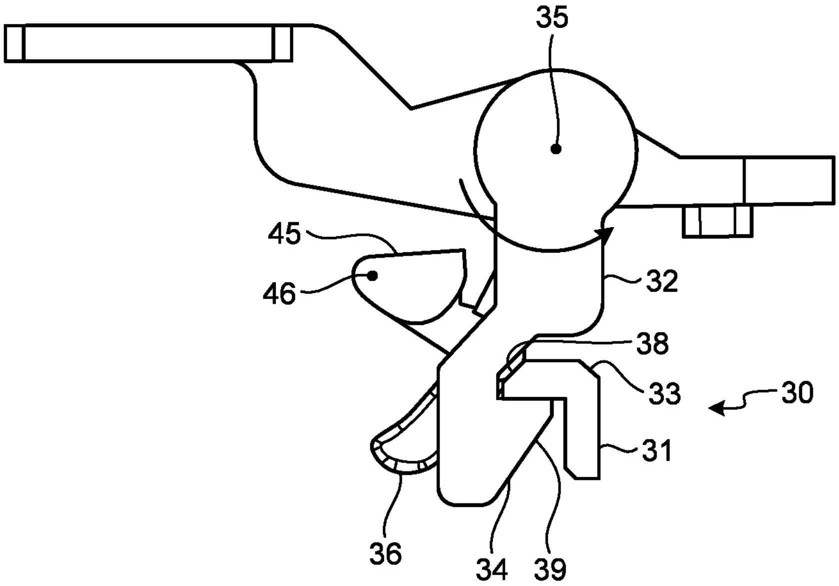
FIG. 19 is a side view illustrating the lock mechanism when the cover member is arranged in the closing position.

FIG. 19 is a side view illustrating the lock mechanism 30 when the cover 3 is arranged in the closing position. When the cover 3 is arranged in the closing position, the cover-side lock member 32 moves toward the first position due to an elastic force applied from the pressing portion 47 to the cover-side lock member 32, so that the cover-side claw 34 hooks to the body-side claw 33. The cover-side claw 34 appropriately hooks to the body-side claw 33, so that the cover-side lock member 32 is arranged in the first position. The cover-side claw 34 hooks to the body-side claw 33, so that the cover 3 is fixed to the image reading apparatus main body 2 with the cover 3 arranged in the closing position.

Figure 20:
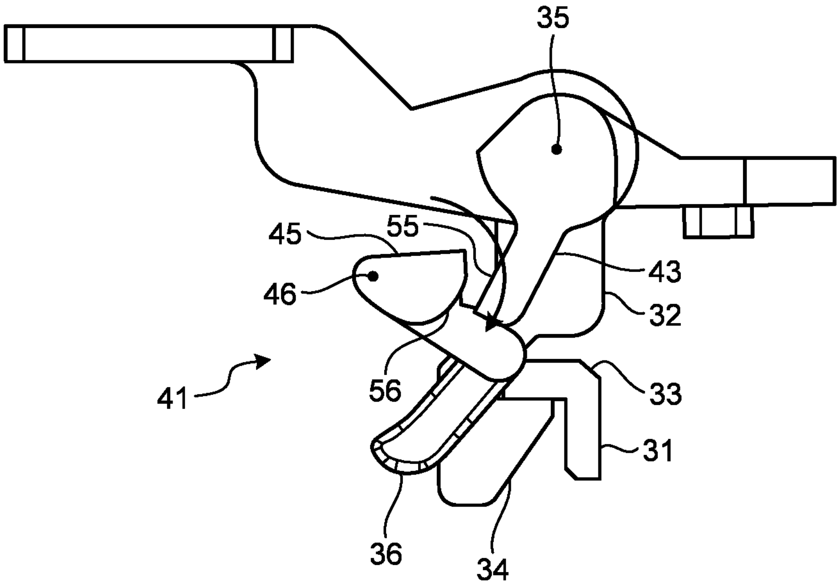
FIG. 20 is a side view illustrating the arm retracting mechanism when the cover member is arranged in the closing position and the cover-side lock member is arranged in a first position.

FIG. 20 is a side view illustrating the arm retracting mechanism 41 when the cover-side lock member 32 is arranged in the first position with the cover 3 arranged in the closing position. When the lock-side contact member 43 is arranged in the first position with the cover 3 arranged in the closing position, the lock-side contact member 43 is away from the arm-side contact member 45. The lock-side contact member 43 is away from the arm-side contact member 45, so that the arm 36 is released so as to be movable with respect to the cover 3.

Thus, when the cover 3 moves from the opening position to the closing position, the cover-side lock member 32 is arranged in the second position in the middle of a shift of the lock mechanism 30 from the first state in which the lock mechanism 30 releases the cover 3 to the second state in which the lock mechanism 30 fixes the cover 3. When the cover-side lock member 32 is arranged in the second position, the arm retracting mechanism 41 retracts the arm 36 from the conveying path 14. Accordingly, the cover-side lock member 32 is arranged in the second position when the cover 3 moves from the opening position to the closing position, so that the arm 36 is retracted from the conveying path 14 when the cover 3 moves from the opening position to the closing position.

When the cover 3 moves from the opening position to the closing position, a medium is sometimes placed on the conveying path 14. The image reading apparatus 1 is able to arrange the arm 36 in the retracting position when the cover 3 moves from the opening position to the closing position. Because the arm 36 is arranged in the retracting position, the image reading apparatus 1 is able to prevent damage to the medium as a result of the arm 36 sticking to the medium placed on the conveying path 14 when the cover 3 moves from the opening position to the closing position.

Effects of the Medium Conveying Apparatus According to the First Embodiment

The medium conveying apparatus according to the first embodiment includes the cover 3, the arm 36, the cover-side lock member 32, and the arm retracting mechanism 41. The cover 3 is supported by the image reading apparatus main body 2 so as to open and close. The arm 36 protrudes into the conveying path 14 formed between the cover 3 and the image reading apparatus main body 2 or the arm 36 is retracted from the conveying path 14. The cover-side lock member 32 fixes the cover 3 to the image reading apparatus main body 2. The arm retracting mechanism 41 retracts the arm 36 from the conveying path 14 when the cover-side lock member 32 shifts from the first state in which the cover-side lock member 32 releases the cover 3 from the image reading apparatus main body 2 to the second state in which the cover-side lock member 32 fixes the cover 3 to the image reading apparatus main body 2. At this time, the medium conveying apparatus is able to prevent damage to the medium as a result of the arm 36 sticking to the medium placed on the conveying path 14 when the cover 3 moves to the closing position.

Furthermore, the arm 36 of the medium conveying apparatus according to the first embodiment is rotatably supported by the cover 3. The cover-side lock member 32 is rotatably supported by the cover 3. A movable portion of the arm retracting mechanism 41 is rotatably supported by the cover 3. At this time, by providing the movable portion that interlocks a movement of the cover-side lock member 32 with a movement of the arm 36 to only the cover 3, it is possible to simply form the arm retracting mechanism 41 and reduce the cost of manufacturing the medium conveying apparatus.

Second Embodiment

Figure 21:
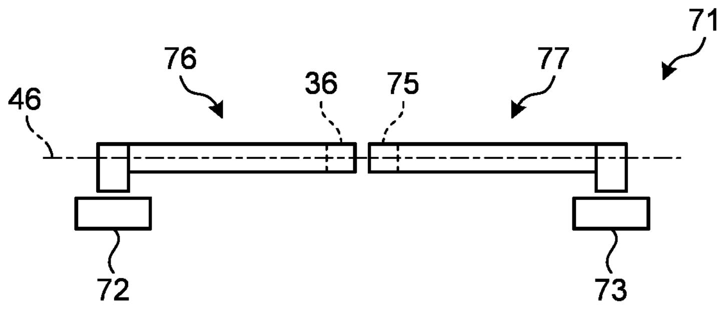
FIG. 21 is a sectional view illustrating a skew correction mechanism of a medium conveying apparatus according to a second embodiment.

A medium conveying apparatus according to a second embodiment has a configuration in which, as illustrated in FIG. 21, a skew correction mechanism 71 is added to the medium conveying apparatus according to the first embodiment described above, and other parts thereof are the same as the medium conveying apparatus according to the first embodiment described above. FIG. 21 is a sectional view illustrating the skew correction mechanism 71 of the medium conveying apparatus according to the second embodiment. The skew correction mechanism 71 is arranged in a region between the separating portion 21 and the first feed roller 22 of the conveying path 14. The skew correction mechanism 71 includes a left stopper 72, a right stopper 73, a right arm 75, a left interlocking mechanism 76, and a right interlocking mechanism 77. The left stopper 72 is arranged on the left side of the conveying path 14. The right stopper 73 is arranged on the right side of the conveying path 14. Both of the arm 36 and the right arm 75 are arranged between the left stopper 72 and the right stopper 73, respectively. Both of the arm 36 and the right arm 75 are arranged closer to the separating portion 21 than the left stopper 72 and the right stopper 73. The right arm 75 is arranged on the right side between the arm 36 and the right stopper 73.

Figure 22:
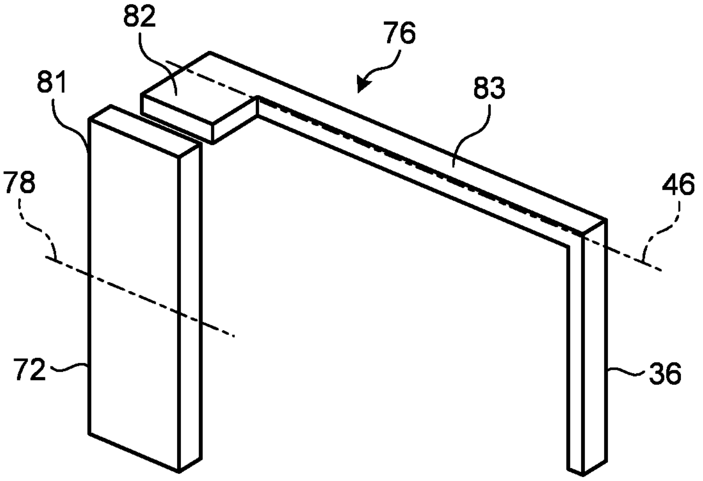
FIG. 22 is a perspective view illustrating a left stopper, an arm, and a left interlocking mechanism.

FIG. 22 is a perspective view illustrating the left stopper 72, the arm 36, and the left interlocking mechanism 76. The left stopper 72 is formed in a belt shape. The left stopper 72 is supported by the cover 3 so as to be rotatable about a stopper rotary shaft 78 to be arranged in the left stopper conveying path blocking position or the left stopper conveying path retracting position. The stopper rotary shaft 78 is parallel to the rotary shaft 46 of the arm 36 and away from the rotary shaft 46. The left interlocking mechanism 76 includes an arm-side abutting portion 82 and a fixing member 83. The arm-side abutting portion 82 is arranged in the vicinity of a stopper-side abutting portion 81 of the left stopper 72 and fixed to the arm 36 via the fixing member 83.

Figure 23:
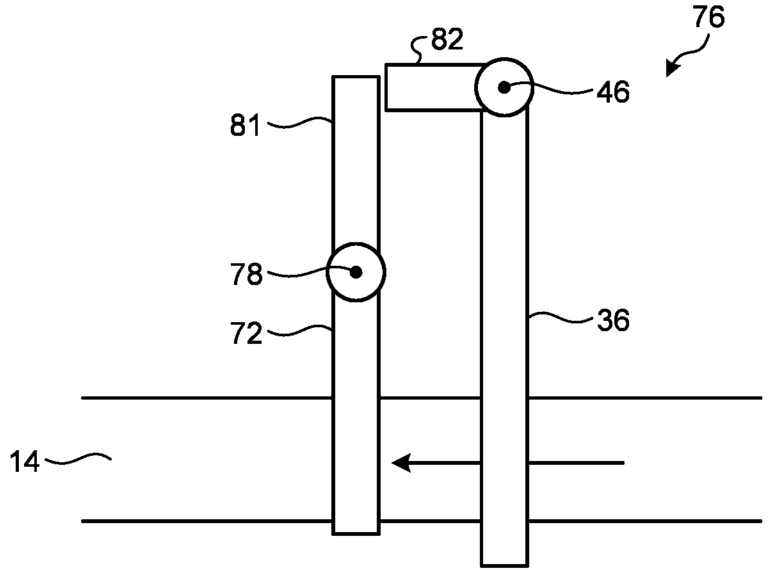
FIG. 23 is a side view illustrating the left stopper, the arm, and the left interlocking mechanism.

FIG. 23 is a side view illustrating the left stopper 72, the arm 36, and the left interlocking mechanism 76. The left stopper 72 is arranged such that when the left stopper 72 is arranged in the left stopper conveying path blocking position, the left stopper 72 blocks the conveying path 14 and contacts with the medium conveyed on the conveying path 14. The left stopper 72 is arranged further from the separating portion 21 than the arm 36 arranged in the blocking position when the left stopper 72 is arranged in the left stopper conveying path blocking position.

The arm-side abutting portion 82 is arranged so as to abut against the stopper-side abutting portion 81 when the arm 36 is arranged in the blocking position and the left stopper 72 is arranged in the left stopper conveying path blocking position. The left interlocking mechanism 76 fixes the left stopper 72 to the left stopper separation conveying path blocking position such that the left stopper 72 does not rotate clockwise from the left stopper separation conveying path blocking position due to a result of the arm-side abutting portion 82 abutting against the stopper-side abutting portion 81.

Figure 24:
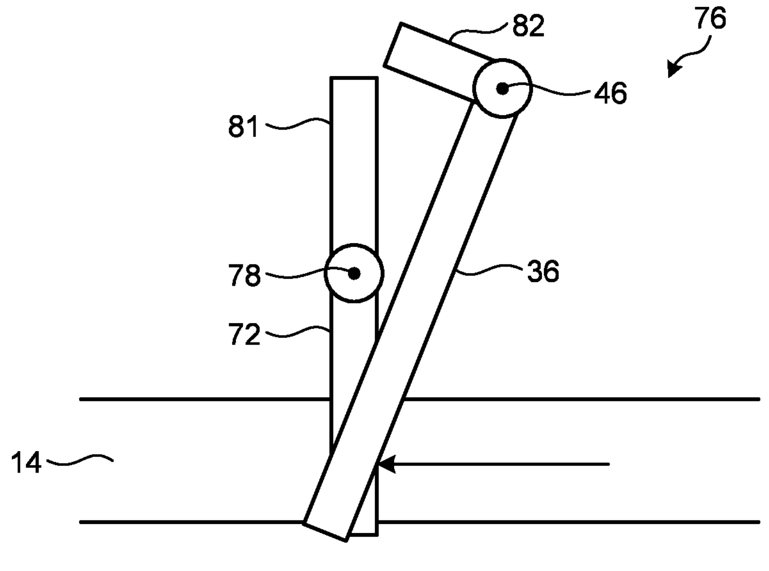
FIG. 24 is a side view illustrating the left interlocking mechanism when the arm is arranged in a left boundary position.

The arm 36 passes the left boundary position when rotating clockwise, in FIG. 23, about the rotary shaft 46 from the blocking position to the retracting position. FIG. 24 is a side view illustrating the left interlocking mechanism 76 when the arm 36 is arranged in the left boundary position. The position that is above the conveying path 14 and blocked by the arm 36 arranged in the left boundary position overlaps with the position that is above the conveying path 14 and blocked by the left stopper 72 arranged in the left stopper separation conveying path blocking position.

The left interlocking mechanism 76 is arranged such that the arm-side abutting portion 82 does not abut against the stopper-side abutting portion 81 when the arm 36 is arranged in the left boundary position. Accordingly, the left interlocking mechanism 76 releases the left stopper 72 such that the left stopper 72 is able to rotate clockwise, in FIG. 24, about the stopper rotary shaft 78 when the arm 36 is arranged in the left boundary position.

The left interlocking mechanism 76 is arranged such the arm-side abutting portion 82 abuts against the stopper-side abutting portion 81 when the arm 36 is arranged in a left confinement region between the left boundary position and the blocking position. Accordingly, the left interlocking mechanism 76 confines the left stopper 72 such that the left stopper 72 is arranged in the left stopper conveying path blocking position when the arm 36 is arranged in the left confinement region.

The left stopper 72 rotates clockwise, in FIG. 24, about the stopper rotary shaft 78 from the left stopper conveying path blocking position, thereby moving toward the left stopper conveying path retracting position. The arm 36 rotates clockwise, in FIG. 24, about the rotary shaft 46 from the left boundary position, thereby moving toward the retracting position.

Figure 25:
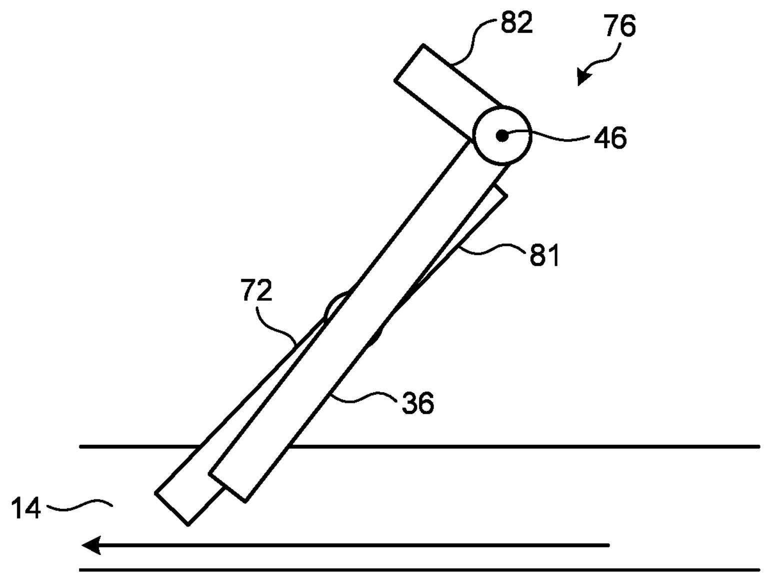
FIG. 25 is a perspective view illustrating the left interlocking mechanism when the arm is arranged in the retracting position and the left stopper is arranged in a left stopper conveying path retracting position.

FIG. 25 is a perspective view illustrating the left interlocking mechanism 76 when the arm 36 is arranged in the retracting position and the left stopper 72 is arranged in the left stopper conveying path retracting position. The arm 36 is retracted from the conveying path 14 when the arm 36 is arranged in the retracting position. The left interlocking mechanism 76 is arranged such that the arm-side abutting portion 82 does not abut against the stopper-side abutting portion 81 of the left stopper 72 when the arm 36 is arranged in the left release region between the left boundary position and the retracting position. Accordingly, the left interlocking mechanism 76 releases the left stopper 72 so as to be movable to be arranged in the left stopper conveying path blocking position or the left stopper conveying path retracting position when the arm 36 is arranged in the left release region.

Because the left stopper 72 is released so as to be movable when the arm 36 is arranged in the retracting position, the left stopper 72 is able to be arranged in the left stopper conveying path retracting position. The left stopper 72 is retracted from the conveying path 14 such that a medium is conveyed along the conveying path 14 when the left stopper 72 is arranged in the left stopper conveying path retracting position.

The right stopper 73 is formed in the same manner as the left stopper 72. Thus, the right stopper 73 is supported by the cover 3 so as to be rotatable about the stopper rotary shaft 78 to be arranged in the right stopper conveying path blocking position or the right stopper conveying path retracting position. The right stopper 73 blocks the conveying path 14 when the right stopper 73 is arranged in the right stopper conveying path blocking position. The position on the conveying path 14 that is blocked by the right stopper 73 arranged in the right stopper conveying path blocking position overlaps with The position on the conveying path 14 that is blocked by the left stopper 72 arranged in the left stopper conveying path blocking position.

The right arm 75 is formed in the same manner as the arm 36. Thus, the right arm 75 is supported by the cover 3 so as to be rotatable about the rotary shaft 46 such that the right arm 75 is arranged in the right arm conveying path blocking position, the right boundary region, or the right arm conveying path retracting position. The right arm 75 blocks the conveying path 14 when the right arm 75 is arranged in the right arm conveying path blocking position or the right boundary region. The right arm 75 is retracted from the conveying path 14 when the right arm 75 is arranged in the right arm conveying path retracting position. A position on the conveying path 14 that is blocked by the right arm 75 arranged in the right boundary region overlaps with a position on the conveying path 14 that is blocked by the right stopper 73 arranged by the right stopper conveying path blocking position.

The right interlocking mechanism 77 is formed in the same manner as the left interlocking mechanism 76 and fixes the right stopper 73 arranged in the right stopper conveying path blocking position to the cover 3 when the right arm 75 is arranged in the right confinement region between the right arm conveying path blocking position and the right boundary region. The right interlocking mechanism 77 releases the right stopper 73 so as to arrange the right stopper 73 in the right stopper conveying path retracting position when the right arm 75 is arranged in the right release region between the right boundary position and the right arm conveying path retracting position.

Figure 26:
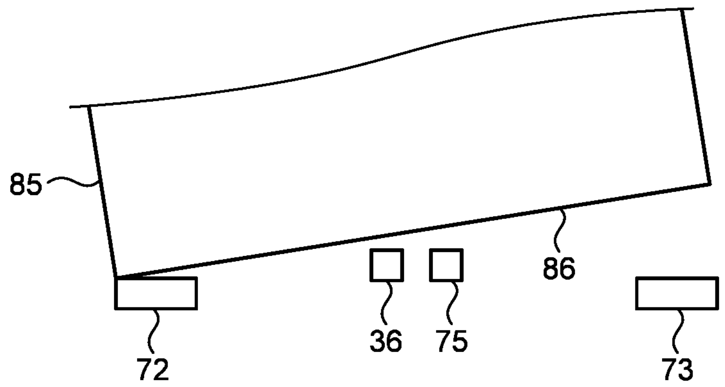
FIG. 26 is a plan view illustrating a medium that passes through the skew correction mechanism.

The medium conveying apparatus according to the second embodiment conveys a medium in the same manner as the medium conveying apparatus according to the first embodiment described above. A medium 85 that is conveyed along the conveying path 14 of the medium conveying apparatus according to the second embodiment is sometimes conveyed along the conveying path 14 with inclined with respect to the conveying path 14, as illustrated in FIG. 26, when passing through the skew correction mechanism 71. FIG. 26 is a plan view illustrating the medium 85 that passes through the skew correction mechanism 71. When the medium 85 passes through the skew correction mechanism 71 in with inclined state, a leading end 86 sometimes abuts against the left stopper 72 of the skew correction mechanism 71. After the leading end 86 abutted against the left stopper 72, the medium 85 bends due to further conveyance to the separating portion 21, and then, rotates substantially about the left stopper 72 such that the leading end 86 of the medium 85 approaches the right stopper 73.

Figure 27:
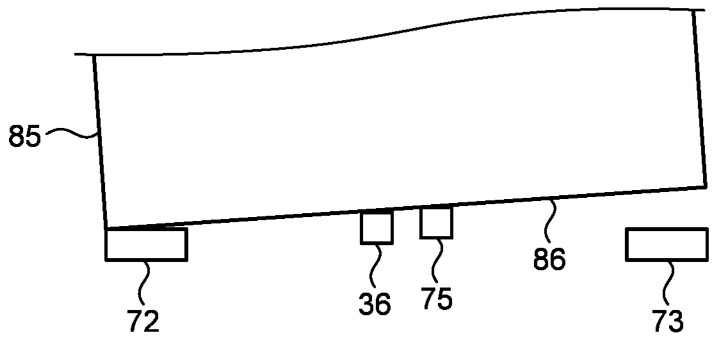
FIG. 27 is a plan view illustrating a medium that abuts against both of the arm and a right arm of the skew correction mechanism.

The leading end 86 further abuts against both of the arm 36 and the right arm 75, as illustrated in FIG. 27, due to rotation of the medium 85. FIG. 27 is a plan view illustrating the medium 85 that abuts both of the arm 36 of the skew correction mechanism 71 and the right arm 75. The medium 85 abuts against the arm 36, so that the arm 36 moves from a blocking region toward the left boundary region. The medium 85 abuts against the right arm 75, so that the right arm 75 moves from the right arm conveying path blocking position toward the right boundary region.

Figure 28:
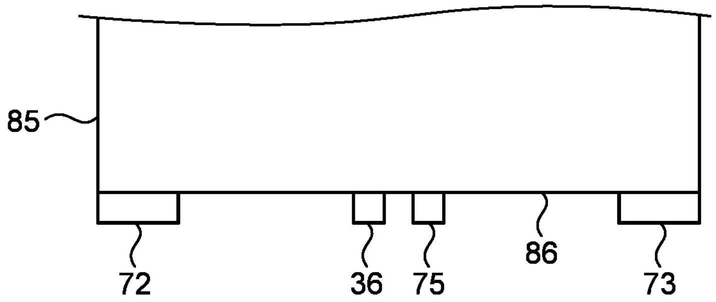
FIG. 28 is a plan view illustrating a medium that abuts against both of the left stopper and a right stopper of the skew correction mechanism.

After the leading end 86 abutted against both of the arm 36 and the right arm 75, the medium 85 further rotates because the medium 85 is conveyed by the separating portion 21. Because the medium 85 further rotate, the leading end 86 abuts against both of the left stopper 72 and the right stopper 73 as illustrated in FIG. 28. FIG. 28 is a plan view illustrating the medium 85 that abuts both of the left stopper 72 and the right stopper 73 of the skew correction mechanism 71. When the medium 85 abuts against both of the left stopper 72 and the right stopper 73, the medium 85 is not inclined with respect to the conveying path 14 such that the skew is corrected and the straight line along the leading end 86 is parallel to the rotary shaft of the first feed roller 22. When the leading end 86 of the medium 85 abuts against both of the left stopper 72 and the right stopper 73, the arm 36 is pressed by the leading end 86, so that the arm 36 is arranged in the left boundary position. The arm 36 is arranged in the left boundary position, so that the left interlocking mechanism 76 releases the left stopper 72 such that the left stopper 72 rotates toward the left stopper conveying path retracting position. When the leading end 86 of the medium 85 abuts against both of the left stopper 72 and the right stopper 73, the right arm 75 is pressed by the leading end 86, so that the right arm 75 is arranged in the right boundary position. The right arm 75 is arranged in the right boundary position, so that the right interlocking mechanism 77 releases the right stopper 73 such that the right stopper 73 rotates toward the right stopper conveying path retracting position.

When the left interlocking mechanism 76 releases the left stopper 72, the medium 85 is conveyed by the separating portion 21, so that the left stopper 72 rotates by being pressed by the medium 85 and is arranged in the left stopper conveying path retracting position. When the right interlocking mechanism 77 releases the right stopper 73, the medium 85 is conveyed by the separating portion 21, so that the right stopper 73 rotates by being pressed by the medium 85 and is arranged in the right stopper conveying path retracting position. The medium 85 is conveyed by the separating portion 21, so that the arm 36 rotates by being pressed by the medium 85 and is arranged in the left lever conveying path retracting position. The medium 85 is conveyed by the separating portion 21, so that the right arm 75 rotates by being pressed by the medium 85 and is arranged in the right lever conveying path retracting position.

The left stopper 72 is arranged in the left stopper conveying path retracting position and the right stopper 73 is arranged in the right stopper conveying path retracting position, so that the medium 85 is conveyed along the conveying path 14 with the straight line along the leading end 86 parallel to the rotary shaft of the first feed roller 22. Similarly, the skew correction mechanism 71 is able to correct the skew of the medium 85 even when the medium 85 abuts against the right stopper 73 before the medium 85 abuts against the left stopper 72. Similarly, the skew correction mechanism 71 is able to correct the skew of the medium 85 even when the medium 85 abuts against the arm 36 or the right arm 75 before the medium 85 abuts against the left stopper 72.

Similarly to the medium conveying apparatus according to the first embodiment described above, the medium conveying apparatus according to the second embodiment is able to arrange the arm 36 in the retracting position when the cover 3 moves to the closing position. Therefore, similarly to the medium conveying apparatus according to the first embodiment described above, the medium conveying apparatus according to the second embodiment is able to prevent damage to the medium as a result of the arm 36 sticking to the medium placed on the conveying path 14. Thus, even when the arm 36 is used to correct the skew of the medium conveyed along the conveying path 14, the medium conveying apparatus according to the second embodiment is able to prevent damage to the medium as a result of the arm 36 sticking to the medium placed on the conveying path 14.

Incidentally, the arm retracting mechanism 41 of the medium conveying apparatus according to the second embodiment retracts only the arm 36 from the conveying path 14 when the cover 3 moves to the closing position; however, in addition, the left stopper 72, the right stopper 73, and the right arm 75 may also be retracted from the conveying path 14. At this time, the medium conveying apparatus is possible to prevent damage to the medium as a result of the left stopper 72, the right stopper 73, and the right arm 75 sticking to the medium placed on the conveying path 14.

Third Embodiment

Figure 29:
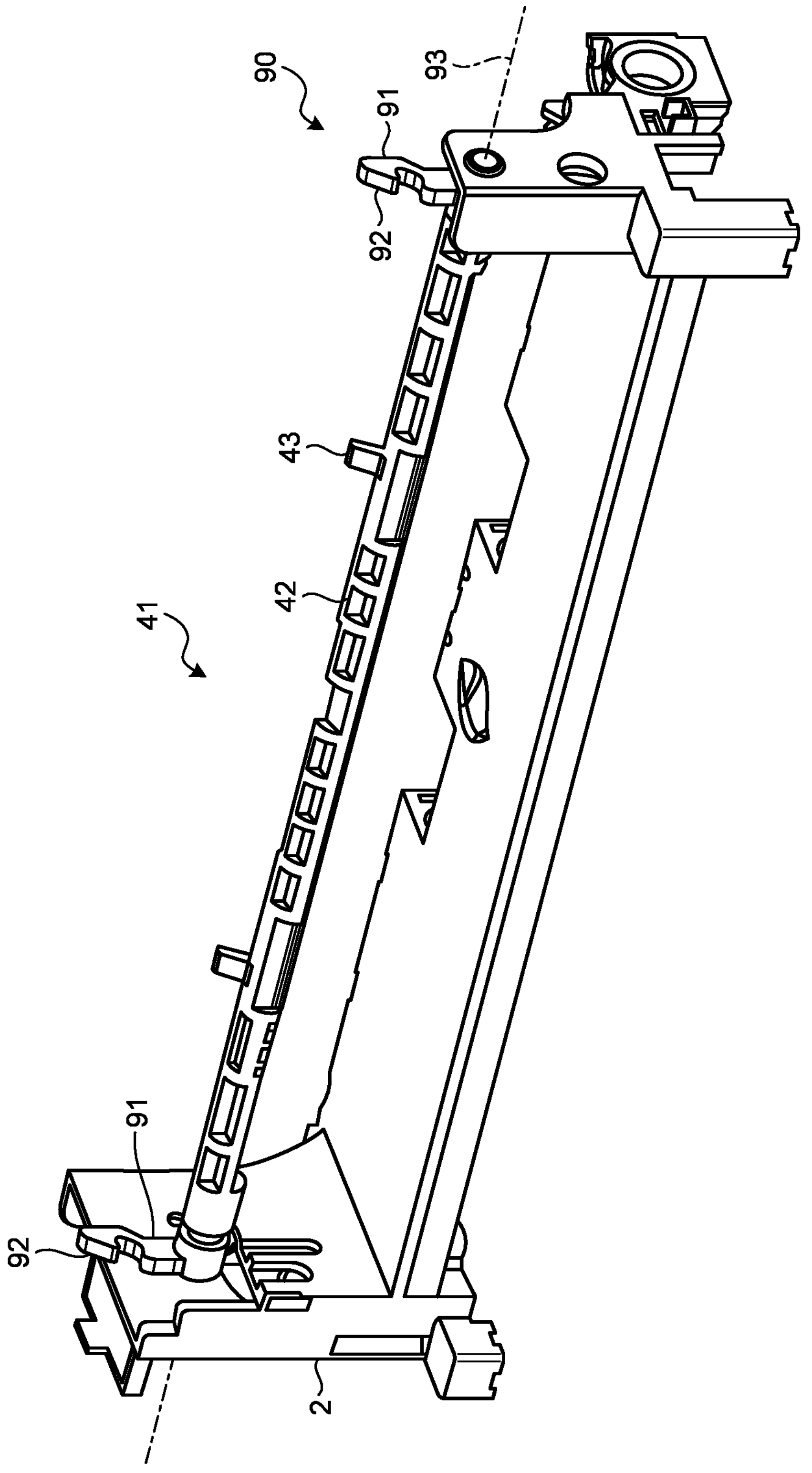
FIG. 29 is a perspective view illustrating a lock mechanism of a medium conveying apparatus according to a third embodiment.

In the medium conveying apparatus according to the embodiments described above, both of the arm 36 and the arm retracting mechanism 41 are supported by the cover 3; however, both of the arm 36 and the arm retracting mechanism 41 may be supported by the image reading apparatus main body 2. As illustrated in FIG. 29, in a medium conveying apparatus according to a third embodiment, the lock mechanism 30 in the medium conveying apparatus according to the first embodiment described above is replaced with another lock mechanism 90. FIG. 29 is a perspective view illustrating the lock mechanism 90 of the medium conveying apparatus according to the third embodiment. The lock mechanism 90 includes body-side lock members 91. Each of the body-side lock members 91 includes a body-side claw 92 and is supported by the image reading apparatus main body 2 so as to be rotatable about a rotary shaft 93 to be arranged in the first position or the second position.

The lock mechanism 90 includes cover-side lock members that are not illustrated. Each of the cover-side lock members includes a cover-side claw and is fixed to the cover 3. Each of the body-side lock members 91 is arranged in the first position when the cover 3 is arranged in the closing position, so that the body-side claws 92 hook to the respective cover-side claws. Thus, similarly to the lock mechanism 30 described above, the body-side claws 92 hook to the respective cover-side claws, so that the lock mechanism 90 fixes the cover 3 to the image reading apparatus main body 2 with the cover 3 arranged in the closing position. Furthermore, when the cover 3 moves from the opening position to the closing position, the body-side lock members 91 shift from the first state in which the body-side lock members 91 release the cover 3 to the second state in which the body-side lock members 91 fix the cover 3. Each of the body-side lock members 91 is arranged in the first position in the first state, arranged in the first position in the second state, and arranged in the second position in the middle of the shift from the first state to the second state.

The lock shaft 42 of the arm retracting mechanism 41 is fixed to the body-side lock members 91 and supported by the image reading apparatus main body 2 so as to be rotatable about the rotary shaft 93. The lock-side contact member 43 to which the lock shaft 42 is fixed comes into contact with the arm-side contact member 45 that is not illustrated in FIG. 29 or is away from the arm-side contact member 45, so that the arm retracting mechanism 41 confines or releases the arm 36. Thus, similarly to the medium conveying apparatus according to the first embodiment described above, the arm retracting mechanism 41 releases the arm 36 so as to be movable such that the arm 36 is arranged in the blocking position or the retracting position when the body-side lock members 91 are arranged in the first position. The arm retracting mechanism 41 confines the arm 36 such that the arm 36 is arranged in the retracting position when the body-side lock members 91 are arranged in the second position. Therefore, the medium conveying apparatus according to the third embodiment is also able to prevent damage to the medium as a result of the arm 36 sticking to the medium placed on the conveying path 14 by retracting the arm 36 from the conveying path 14 when the cover 3 moves to the closing position.

Incidentally, the medium conveying apparatus according to the embodiments described above is used in an image reading apparatus, but may also be used in another apparatus. An example of the apparatus includes a printer. For example, when the medium conveying apparatus is used in a printer, the lower-side reading portion 26 is omitted and the upper-side reading portion 27 is replaced with a printing unit that prints a diagram onto a medium. Even if the medium conveying apparatus is used in an apparatus different from the image reading apparatus, the medium conveying apparatus is able to prevent damage to the medium as a result of the arm 36 sticking to the medium placed on the conveying path 14 by retracting the arm 36 from the conveying path 14 when the cover 3 moves to the closing position.

The medium conveying apparatus according to the present disclosure is able to prevent damage to a medium.

All examples and conditional language recited herein are intended for pedagogical purposes of aiding the reader in understanding the disclosure and the concepts contributed by the inventor to further the art, and are not to be construed as limitations to such specifically recited examples and conditions, nor does the organization of such examples in the specification relate to a showing of the superiority and inferiority of the disclosure. Although the embodiments of the disclosure have been described in detail, it should be understood that the various changes, substitutions, and alterations could be made hereto without departing from the spirit and scope of the disclosure.

What is claimed is:

1. A medium conveying apparatus comprising:

a cover that is supported by a main body so as to be arranged in an opening position or a closing position;

an arm that i) protrudes into a conveying path formed between the cover and the main body to block the conveying path when a medium conveyed along the conveying path is skewed, and ii) is retracted from the conveying path when the medium is not skewed;

a lock member configured to fix the cover to the main body with the cover arranged in the closing position;

a retracting shaft configured to rotate to retract the arm from the conveying path when the lock member shifts from a first state in which the lock member releases the cover from the main body to a second state in which the lock member fixes the cover to the main body; and a skew corrector including a stopper such that the skew corrector confines the stopper to block the conveying path when the arm protrudes into the conveying path and releases the stopper to open the conveying path when the arm is retracted from the conveying path.

2. The medium conveying apparatus according to claim 1, wherein the arm is supported by the cover, and the lock member is supported by the cover.

3. The medium conveying apparatus according to claim 2, wherein the arm is rotatably supported by the cover, the lock member is rotatably supported by the cover, and the retracting shaft is rotatably supported by the cover.

4. A medium conveying apparatus comprising:

a cover that is supported by a main body so as to be arranged in an opening position or a closing position;

an arm that is supported by the cover, protrudes into a conveying path formed between the cover and the main body, and is retracted from the conveying path;

a lock member that is supported by the cover and is configured to fix the cover to the main body with the cover arranged in the closing position; and a retracting shaft configured to rotate to retract the arm from the conveying path when the lock member shifts from a first state in which the lock member releases the cover from the main body to a second state in which the lock member fixes the cover to the main body, wherein, when a medium conveyed along the conveying path is skewed, the arm blocks the conveying path and, when the medium is not skewed, the arm is retracted from the conveying path.

5. The medium conveying apparatus according to claim 4, wherein the arm is rotatably supported by the cover, the lock member is rotatably supported by the cover, and the retracting shaft is rotatably supported by the cover.

6. A medium conveying apparatus comprising:

a cover that is supported by a main body so as to be arranged in an opening position or a closing position;

an arm that i) protrudes into a conveying path formed between the cover and the main body to block the conveying path when a medium conveyed along the conveying path is skewed, and ii) is retracted from the conveying path when the medium is not skewed;

a lock member configured to fix the cover to the main body with the cover arranged in the closing position;

a retractor that includes a lock-side contact member that is fixed to the lock member, and an arm-side contact member that is fixed to the arm; and a skew corrector including a stopper such that the skew corrector confines the stopper to block the conveying path when the arm protrudes into the conveying path and releases the stopper to open the conveying path when the arm is retracted from the conveying path, wherein the lock-side contact member comes into contact with the arm-side contact member such that the arm is retracted from the conveying path when the lock member shifts from a first state in which the lock member releases the cover from the main body to a second state in which the lock member fixes the cover to the main body.

* * * * *